March 25, 1941.  W. J. BESLER ET AL  2,235,957
GEARED TWO CRANK LOCOMOTIVE UNIT
Filed Jan. 7, 1938  3 Sheets-Sheet 1
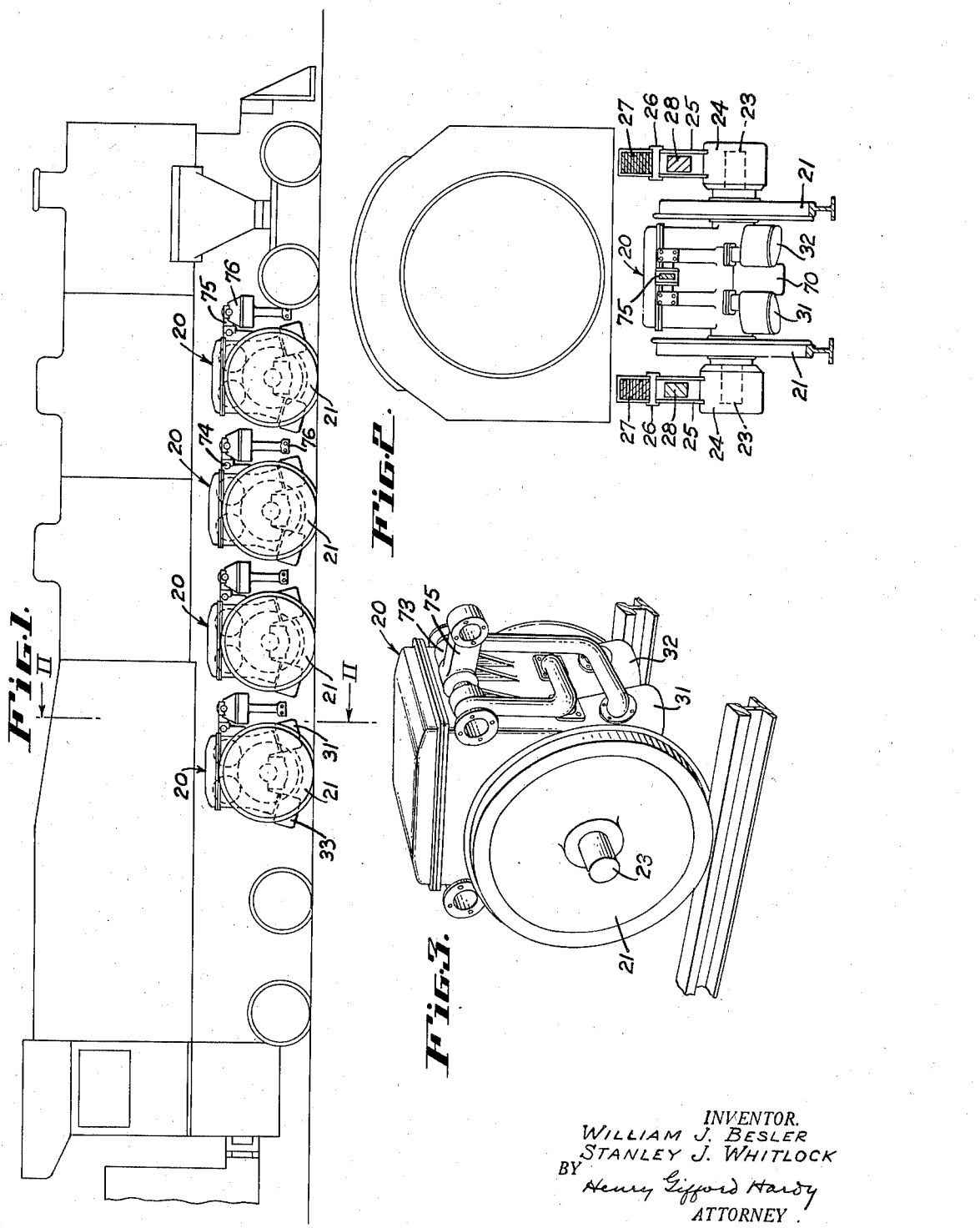
INVENTOR.
WILLIAM J. BESLER
STANLEY J. WHITLOCK
BY Henry Gifford Hardy
ATTORNEY.

March 25, 1941.                    W. J. BESLER ET AL                    2,235,957
                          GEARED TWO CRANK LOCOMOTIVE UNIT
                     Filed Jan. 7, 1938              3 Sheets-Sheet 2
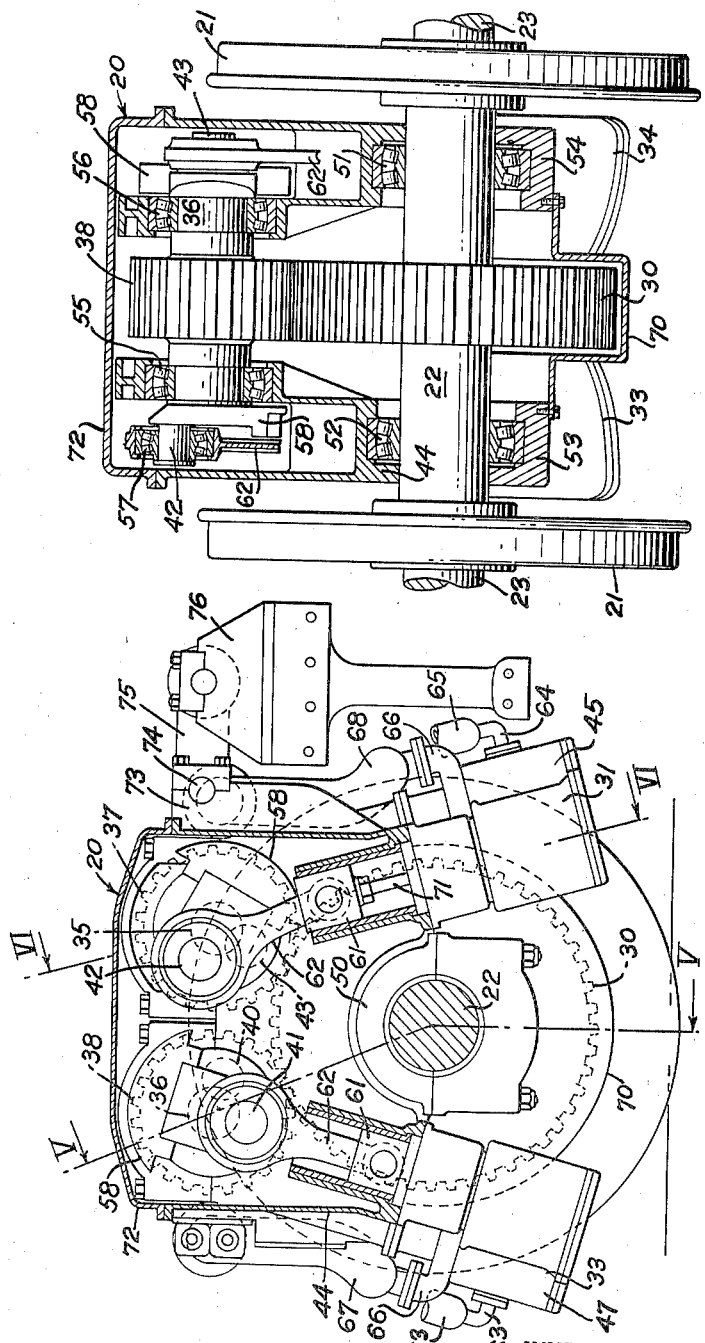
INVENTORS
WILLIAM J. BESLER
STANLEY J. WHITLOCK
BY Henry Gifford Hardy
                ATTORNEY.

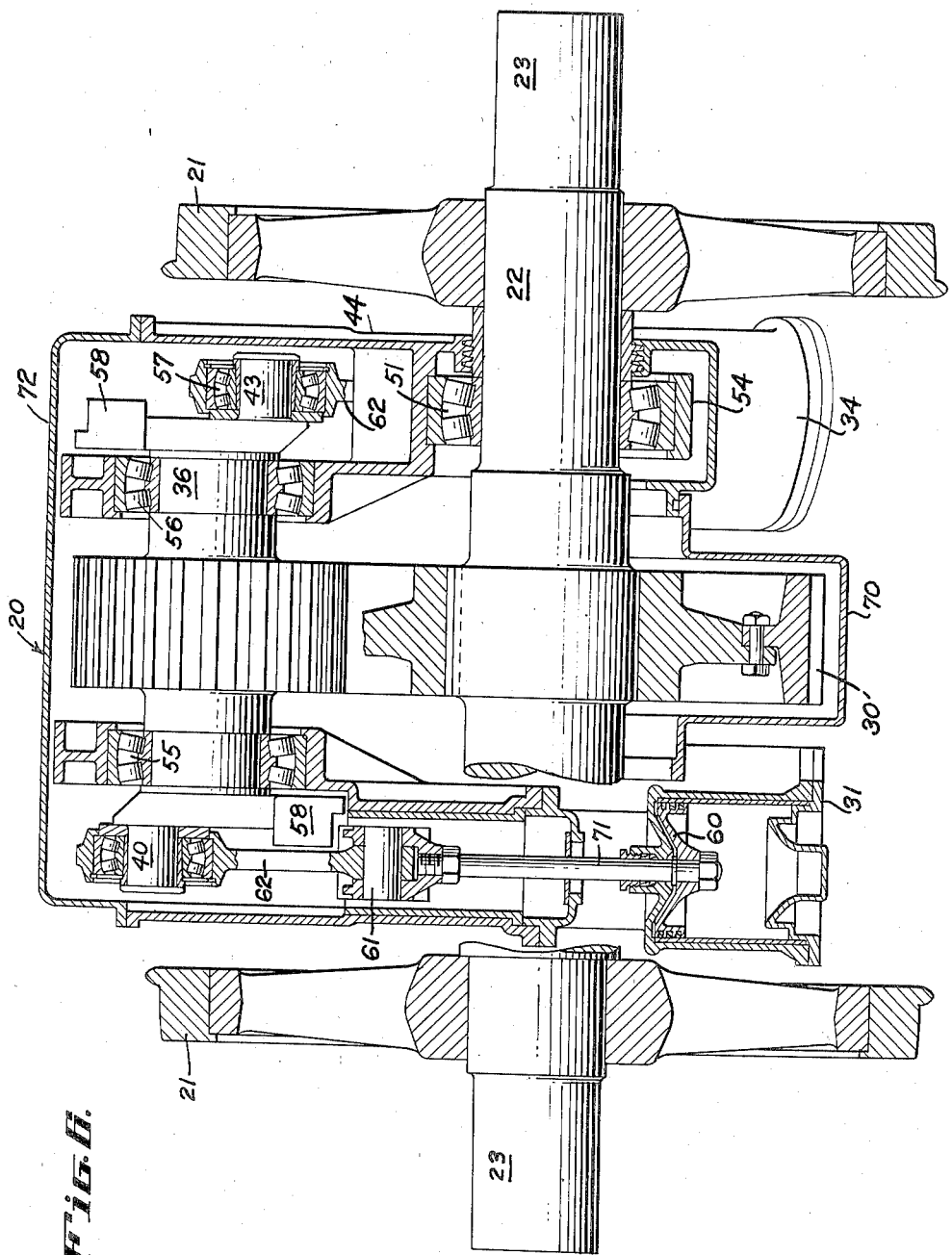

Patented Mar. 25, 1941

2,235,957

UNITED STATES PATENT OFFICE 2,235,957

GEARED TWO CRANK LOCOMOTIVE UNIT

William J. Besler, Plainfield, N. J., and Stanley J. Whitlock, Oakland, Calif.

Application January 7, 1938, Serial No. 183,842

13 Claims. (Cl. 105—37)

The present invention relates to steam locomotives employing a plurality of cylinders and more particularly to locomotives having individual engine units mounted on and carried by the drive axles, each engine unit employing a plurality of cylinders.

It is the object of the present invention to overcome the various problems and objections encountered in present methods of railroad and locomotive practices and in addition to supply factors of safety, comfort and ease of operation which will give better performance judged by the standards of current requirements.

Therefore, it is among the objects of the present invention to produce a locomotive having multi-cylinder steam engine units directly geared to the traction axles. Such engine units are provided with two independently operated but synchronized crank-shafts as will hereafter be fully explained, each shaft being geared directly to the traction axle. By such novel arrangement adequate gearing is secured without danger of gear tooth overloading and exhausting the tolerances permitted for load and wear.

It is also an object of the present invention to provide an engine unit in which there are two drive pinions so that large tooth contact may be obtained which will be the equivalent to a wide gear face without the distortional effects thereof. Likewise the employment of a plurality of driving pinions permits distribution of the driving force over a greater width of gear face.

A further object of the invention is the provision of such a unit employing a plurality of driving pinions so that the gear face may be narrower and thus allow proper space for bearings, crank-shafts, connecting rods, and other essential parts within the necessary space limitations.

It is an object of the present invention to provide a geared engine suitable for mounting on a locomotive traction or driving axle which is compact without sacrifice of efficiency and so conforms to the space limitations involved; which is light in weight; which may be easily removed as a unit, not only from the locomotive but also from the axle itself and wherein the stuffing boxes and other parts requiring attention may readily be serviced from the pit or on the railroad ties if a pit is not available.

Another object of the invention is to lower the stresses in the individual crank-shafts for units of the same horse power but employing a single crank-shaft and pinion.

A further object is to provide an engine unit in which good balance may be secured by equal distribution of weight about the driving axle.

It is also an object herein to provide an engine unit in which variable internal dynamic balance is obtained and in which the novel arrangement of parts, among other things, eliminates the unbalanced dynamic forces and thereby minimizes the problems and difficulties now encountered from "track hammer" which is commonly known to be the product of such unbalanced forces.

A further object of the present invention is the production of such an engine unit mounted on and carried by the drive axle in which the main frame is so disposed that all the forces produced by the crank-shafts, pistons, gearing, bearings, counter-balanced couples, inertia, etc., are taken within a single structure and so permits the top cover plate of the engine to be of light construction for ready accessibility since no forces go through this section.

Another object of the present invention is to provide a multi-cylinder twin shaft steam engine unit mounted between the drive wheels on the drive axle and riding with and taking alignment from the said axle.

Another object is to provide a locomotive with individual powered units with twin shafts each mounted on a driving axle in which the totally enclosed moving parts operate in a bath of oil for positive lubrication.

Another object of the invention is the provision of a steam powered locomotive which has no main and side or connecting rods with their requisite counter-balances, and therefore eliminates, among other things, the customary vibration.

Another object is to provide an interchangeable steam engine power unit which may be removed, repaired and replaced as a unit without taking the entire locomotive out of service.

A still further object is the provision of a steam locomotive having a plurality of multi-cylinder driving units and having a practically continuous application of power or constant torque even at slow speeds, a high acceleration and a smooth even operation.

Further objects are to provide a construction of maximum simplicity, economy and ease of assembly, and such further objects, advantages and capabilities as will later more fully appear and as are inherently possessed thereby.

The invention further resides in the combination, construction and arrangement of parts illustrated in the accompanying drawings, and while there is shown therein a preferred embodiment it is to be understood that the same is capable of further modification and change, and comprehends other details and constructions without departing from the spirit or the scope of the present invention and the appended claims.

Referring now to the drawings:

Figure 1 is a schematic view showing the general outline of a conventional locomotive in side elevation. Four drive units are shown in their relative positions with the main side frames, springs, journal saddles and boxes removed.

Figure 2 is a sectional view taken on the line II—II of Figure 1 showing the multi-cylinder engine unit mounted on the drive axle and between the wheels.

Figure 3 is a perspective view of an individual locomotive drive unit.

Figure 4 is a view partly in section and partly in elevation of a drive unit showing the inclined cylinders and the mounting of the unit on the axle as well as the manner of attaching the unit to the locomotive main frame.

Figure 5 is a vertical section taken on the line of V—V of Figure 4.

Figure 6 is a vertical section taken on the line VI—VI of Figure 5.

Referring now more particularly to the drawings, there is illustrated in Figure 1 an outline of a conventional locomotive in side elevation with four of the individual and independent drive units in their relative positions to demonstrate a portion of the invention herein. The individual drive units, best shown in Figure 3, are indicated by the numeral 20. This unit comprises in general a pair of drive wheels 21, an axle 22, and a multi-cylinder steam engine having two crank-shafts, each geared to the main drive gear of the axle and mounted on the axle 22 between the wheels 21 so that the engine rides with and takes its alignment from the said axle.

The axles which carry the engines have suitable end portions 23 for journaling in journal boxes 24. The journal boxes 24 may be of the conventional type, but the axle 22 is so journaled as to permit a limited but free lateral movement which further enhances the flexibility of the individual drive units making it possible for the locomotive to negotiate curves at a higher rate of speed and with considerable less end overhang. It is likewise true that with this construction of individual power units the effective rigid wheelbase of the locomotive is greatly and materially reduced.

In Figure 2 the journal boxes 24 are sprung to the main engine frame through saddles 25, rocker pin 26, and leaf springs 27, the main side frame is shown in Figure 2 as at 28 and may include a binder member (not shown) running between depending portions of the main side frame 28 and under the journals 24 in the customary manner.

Mounted on the axle 22 and substantially midway between the drive wheels is the main drive gear 30 which takes the driving power supplied by the steam engine for driving the locomotive. The engine unit may generally be characterized as a multiple cylinder reciprocating engine with the cylinders disposed on either side of the axle for effective mass balance, and with the planes of reciprocation inclined toward each other. In the drawings there is shown an engine unit 20 having four cylinders 31 to 34 inclusive two each disposed on either side of the axle 22, and with the cylinders inclined at an angle of 15° from the vertical or having a total inclination of 30°. The engine is further characterized by having two crankshafts 35 and 36 each having at its substantially mid longitudinal point a pinion gear 37 and 38 respectively which mesh with and drive the common main drive gear 30. Crank-shafts 35 and 36 are identical and parallel and revolve at the same rate and in the same direction of rotation of necessity since both are geared to and drive the main drive gear 30. The forward crank 35, assuming the direction of movement is from left to right as viewed in Figure 4, has two cranks 42 and 43, one at either end, and placed at 90° from each other. Likewise the rear crankshaft 36 has two cranks 40 and 41 placed one at either end and 90° from each other. The crank-shaft 36 is shown with crank-pin 41 at dead center at the bottom of the stroke and 150° out of phase with its corresponding crank-pin 42 on shaft 35 each bank of cylinders being shown at an inclination of 15° from the vertical.

As is clearly shown in Figures 4 and 6, the engine is bound around a large engine block 44 which may be preferably a single casting to which the cylinders 31 to 34 inclusive and the valve cylinders 45 to 48 inclusive may be attached in any suitable way by any well-known means. The engine block 44 is so formed on its lower surface with a longitudinal semi-circular groove as at 50 so as to partially surround and rest on the axle 22. Suitable space is provided in the engine block 44 for axle bearings 51 and 52. This engine block 44 is held on the axle 22 so that it rides with it by bearing supports 53 and 54. The bearing supports also provide space for the bearings 51 and 52 in complement to the engine block 44. It will be seen from this that the entire engine portion of the drive unit may be removed from the axle by merely removing the axle bearing supports 53 and 54 and either lifting the engine upward or dropping the drive wheel and axle. In this way not only is the unit replaceable in a locomotive as a unit, but the engine portion of each unit and the axle-drive wheel portions are replaceable which further enhances not only the efficiency of operation but the efficiency of maintenance to a point far beyond anything which was heretofore known.

The individual crank-shafts 35 and 36 are mounted in a suitable recess of the engine block 44 with suitable bearings 55 and 56.

Crank-pins 40 to 43 inclusive are likewise equipped with suitable bearings 57 and have appropriate counterweights 58 as will later be more fully described in connection with balancing of the engine.

The construction of the reciprocating portions of the engine such as the piston heads 60, crossheads 61, connecting rods 62, bearings 57, etc., may all be of standard construction for reciprocating steam engines.

Live steam is admitted through the valve cylinders 45 to 48 both inclusive, through inlet manifolds 63 and 64, and connections 65. The exhaust steam is removed by pipe connections 66 to exhaust manifold 67 and 68. It is to be understood that any suitable valve gear may be employed for controlling the admission of live steam and hence the speeds forward, reverse and appropriate cut offs. All of the engine units operate independently of each other except that all derive the live steam from the single source on the main locomotive frame.

Directly below the main drive gear and suitably attached on either side to the bearing supports 53 and 54 is an oil pan 70. This oil pan is secured to the said bearing supports in oil tight fit so that lubricating oil may be maintained thereon. It will be seen that the main drive gear 30 revolves at all times in the bath of oil maintained in this pan, and as it rotates lubricating oil is carried to the pinion gears 37 and 38 and squeezed out in the meshing of the gears so that oil is carried to the crank-shaft bearings 55 and 56, to the crank bearings 57 and even to the cross-heads 61 and piston rods 71. Also, lubricating oil from this source is supplied to the axle bearings 51 and 52 so that positive lubrication is supplied in addition to the customary pressure lubrication thus maintaining ample lubrication at all times from two independent sources.

The top of the engine block is closed with a cover member 72 which is fastened to the top of the engine block in any suitable way. No loads or forces of any kind go through this cover member 72 with the result that it can be made of lighter material which not only effects the savings in fabrication but provides a light simple means for easy access to the top of the engine units and to the crank-shafts.

The engine block likewise has at its forward position a vertical median fin 73 upon which is mounted a self aligning torque bar bearing 74 for attachment to the torque bar 75 which in turn is connected to the transom member 76 of the main frame of the locomotive. It will be seen, therefore, that the only connection between the main locomotive frame and the individual power units 20 is the torque bar 75 and the journalings of the axle 22. All that is necessary to remove a single power unit is to release the axle 22 from its journals 24 and disconnect the torque bar 75. In this manner a unit may be taken out either at a pit or on the track if necessary and a new complete power unit replaced without taking the entire locomotive out of service for repair.

The balancing of the engines of the individual drive units is an important feature of the present invention because of the complete balance of the primary force and couples.

To understand the balancing of the engine having two crank-shafts revolving in the same direction where the planes of reciprocation are inclined, such as is shown in the drawings and disclosed herein, the characteristics and requirements should first be stated.

1. The crank-shafts must be parallel to each other, revolve at the same speed and in the same direction. Since the pinion on each crank shaft drives directly on the ring gear mounted on the axle, there can be no question but that the two crank-shafts fully respond to this condition.

2. There may be one or more cranks on each shaft but the plane of rotation of each crank must be in the same plane as the corresponding crank on the second shaft. As shown herein each crank shaft has two overhung pins, one at each end, and each crank-shaft is identical as to length. Therefore, the corresponding crank on the parallel shaft has the same plane of rotation.

3. The masses reciprocated by the cranks of each crank-shaft must move in the same plane, but the planes of reciprocation of each crank-shaft need not be parallel to each other. This is illustrated by the fact that the cylinders whose pistons drive one crank-shaft all lie in the same plane, but the opposing cylinders do not lie in a parallel plane. In Figure 4, for example, the cylinders as distributed on either side of the axle 22 are inclined toward each other at an angle of 30°.

It is obvious that two kinds of motion are involved in the balancing of the present engine, i. e., the rotating masses and the reciprocating masses and therefore they must be reduced to a common denominator to explain the balancing. The projection of a rotating point on a straight line is harmonic motion, and likewise reciprocating motion as produced by an infinitely long connecting rod is harmonic motion. If two masses whose centers are points revolve in opposite directions but through the same circular path they will coincide with each other twice during the revolution and these two points of coincidence determine a line on which the projections of the points, which represent the centers of the revolving masses, will be harmonic motion. The inertia components of the masses are perpendicular to the determined line and being equal and opposite will cancel each other. Therefore, reciprocating motion may be treated as though composed of the rotating masses as described above. The reciprocating masses are considered as replaced by two rotating masses, each equivalent in weight to one-half of the reciprocating mass and each revolving in opposite directions and in such a way that their mass centers lie upon each other when the reciprocating force they replace is at a maximum. This means that one of these masses then is assumed or becomes a part of the rotation with the crank-pin while the other rotates in the opposite direction to the crank-pin.

So far as balancing the rotating parts of the crankshaft itself, generally all that is required is the addition of a counter-weight of equal mass moment and opposite in direction to the force on the crank-pin, and likewise that part of the reciprocating force assumed rotating with the shaft can easily be balanced by adding to the counter-weight sufficient additional weight to produce an equal and opposite force but this balancing does not take care of the force or the couple produced by the mass revolving in the opposite direction from that of the crank-pin. The system of rotating masses is broken down to unbalanced forces and couples. The axis of a couple is a line perpendicular to the crankshaft and intersecting its center. Vectors may be used to represent the force and couples, the vector of the couple being a line representing the axis of the couple and its direction of rotation indicated by an arrowhead placed in the direction such that when the couple tends to rotate clockwise when looking along the axis perpendicular to the plane of the couple the arrowhead is directed away from the observer.

In order that the balancing may be reduced to a formula, the three masses to be considered are as follows:

a. The rotating masses consisting of the crank-pin and part of the connecting rod, which may be arbitrarily designated as R.

b. A mass equal to one-half of the reciprocating masses assumed as revolving with the crank-pin, and arbitrarily designated as F.

c. A mass equal to one-half of the reciprocating weights assumed to be revolving in a direction opposite to the crank-pin, and designated as N.

The rotating masses R and F may be added together as both revolve with the crank-pin. The R plus F mass will have a resultant force and couple. It is these forces and couples that may be readily balanced on the individual crank-shafts by proper counter-weights. The resultant force, however, can be represented by a vector drawn from the center of the shaft as viewed from the end and the axis of the couple will lie in the same line, its direction being indicated by an arrowhead as previously described. Likewise, the same procedure may be used for the N masses although these may not be balanced as shown in the present case by merely adding counter-weights because of the opposite rotation.

Similarly the R plus F and N masses may be diagrammed for the second crank-shaft with results identical to those stated before.

When the planes of reciprocation are inclined as shown herein, it will be seen that the R plus F resultant force vector and the R plus F couple vector of each shaft are in static and dynamic balance, but the N force and couple vectors are not parallel and as these are rotating in the opposite direction to the crank-pin the couple vectors cannot be balanced by the addition of counter-weights on the crank-shafts. However, by rotating one of the crank-shafts with relation to the other, the N couple vector of one shaft can be made parallel and opposite to the N couple vectors of the other shaft, and since couples with parallel axes revolving in opposite directions will cancel each other, these couples are cancelled. To bring the engine into complete primary balance the N forces likewise must be balanced. This is accomplished by placing a counter-weight on each crank-shaft equal to the N force but rotating in the opposite direction and therefore with the crank-shaft. The added weight plus the N force cerates a reciprocating force on each crank-shaft. The reciprocating forces so produced on each crank-shaft being diametrically opposed balance each other out, therefore, the engine is brought into complete balance as to primary couples and forces.

We claim.

1. In a steam vehicle, a plurality of separate and interchangeable steam engine-axle units balanced as to mass on the driving axle comprising a pair of driving wheels with a drive axle therebetween and a multi-cylinder steam engine wherein the planes of reciprocation are inclined toward each other having two identical crank-shafts each transmitting power to the driving axle through individual pinions meshing with a common gear mounted on said axle.

2. In a steam vehicle, a plurality of interchangeable steam engine-axle units balanced as to mass on the driving axle comprising a pair of driving wheels with a drive axle therebetween and a multi-cylinder steam engine wherein the planes of reciprocation are inclined toward each other, having two identical crank-shafts each transmitting power to the driving axle through individual pinions meshing with a common gear mounted on said axle, each of which units is connected to the vehicle only by means of the drive axle journals and a torque bar.

3. A steam locomotive having a plurality of separate driving units each comprising an engine mounted in static balance on and geared to the driving axle of the drive wheels, said engine being a multi-cylinder steam engine with inclined planes of reciprocation and having two parallel crank-shafts revolving at the same speed and in the same direction, and each crank shaft having a plurality of cranks, the plane of rotation of each crank being in the same plane as the corresponding crank on the other crank-shaft.

4. A steam locomotive having a plurality of separate driving units each comprising an engine mounted substantially in static balance upon and geared to the driving axle of the drive wheels, said engine being a multi-cylinder steam engine with inclined planes of reciprocation and having two parallel crank-shafts revolving at the same speed and in the same direction, both crank-shafts having a crank at each end set at 90° to each other, the cranks on the second shaft being placed 150° plus the angle of inclination out of phase with the cranks on the first of said crank-shafts.

5. A steam locomotive having a plurality of separate power units, each of said units comprising in combination a pair of drive wheels, a drive axle therebetween, and a multi-cylinder engine mounted in static balance on said axle and between said wheels, said engine having inclined cylinders, a pair of identical and parallel crank-shafts adapted for rotation at the same speed and direction each with a plurality of cranks operating in the same plane of rotation as the corresponding crank on the other shaft, said cranks transmitting power to the driving axle through pinions geared to a common gear mounted on said axle.

6. A steam locomotive having a plurality of separate power units, each of said units comprising in combination a pair of drive wheels, a drive axle therebetween, and a multicylinder engine mounted in static balance on said axle in unsprung weight and between said wheels, said engine having inclined cylinders and a pair of identical parallel crank-shafts for transmitting power to the drive axle through pinions on said shafts geared to a common gear mounted on said axle, said crank-shafts being adapted for rotation at the same speed and direction and each provided with a plurality of cranks operating in the same plane of rotation as the corresponding crank on the other shaft, and counterweights on each shaft for complete dynamic balance in operation treating the reciprocating forces as two rotating forces each equivalent in weight to one-half of the reciprocating mass and each revolving in the opposite direction and in such a way that their mass centers lie upon each other when the reciprocating force which they replace is at a maximum.

7. A steam locomotive having a plurality of separate power units, each being attached to the locomotive main frame through a torque link and the journaling of the axle only, each of said units comprising in combination a pair of drive wheels, a drive axle therebetween, a multi-cylinder engine mounted substantially in static balance on said axle and between said wheels, said engine having inclined cylinders and a pair of identical and parallel crank-shafts for transmitting power to the driving axle and counterweights on each of said crank-shafts for complete dynamic balance of all primary forces and couples in operation by treating the reciprocating forces as two rotating forces each equivalent in weight to one-half of the reciprocating mass and each revolving in the opposite direction and in such a way that their mass centers lie upon each other when the reciprocating force which they replace is at a maximum, and providing on each shaft suitable counterweights for such translated reciprocating forces.

8. In a steam locomotive having a plurality of separate power units attached to the main frame only by means of a torque bar and the journaling of the axle, each of said units comprising in combination a pair of drive wheels, an axle therebetween, and a multi-cylinder steam engine mounted substantially in static balance on said axle and between said wheels in unsprung weight, said engine being provided with two identical and parallel crank-shafts for essential mass balancing and dynamic balancing of all primary forces and couples, each transmitting power to the drive axle through pinions mounted on said shafts and geared to a common gear mounted on said axle.

9. In a steam vehicle, a plurality of separate steam engine-axle units comprising a pair of drive wheels with a drive axle therebetween, and a multi-cylinder steam engine wherein the planes of reciprocation are inclined on either side of said axle, having two crank shafts each transmitting power to the drive axle, and means on the said two crank shafts for accomplishing not only essential mass balance but also dynamic balance of all primary forces and couples.

10. A locomotive having a plurality of separate twin crank-shaft reciprocating steam engine units each mounted in substantially static balance upon and taking alignment from an axle of the drive wheels and each operating independently of other similar units except for a common source of live steam, cranks on each end of each crank-shaft 90 degrees out of phase on each shaft, counter-weights for establishing mass balance of said cranks, said crank-shafts and cranks being correlated so that the couple of one shaft is equal and opposite in direction to the couple of the second or twin shaft, thereby accomplishing dynamic balance of all primary forces and couples.

11. In a steam locomotive arranged for constant torque propulsion having main side frames and springing outside the driving wheels, a plurality of separate twin crank-shaft multi-cylinder reciprocating steam engine units each mounted in substantially static balance upon and taking alignment from a drive axle, each unit operating independently of the other similar units except for a common source of live steam, each unit being connected to the main locomotive frame by a single torque link only, cranks on each end of each crank-shaft 90 degrees out of phase on each shaft, counter-weights for establishing mass balance of said cranks, said crank-shafts and cranks being correlated so that the couple of one shaft is equal and opposite in direction to the couple of the second or twin shaft, thereby accomplishing dynamic balance of all primary forces and couples.

12. A steam locomotive having a plurality of driving units each comprising a single engine mounted in substantially static balance upon and geared to a driving axle of the drive wheels, said engine being a multi-cylinder steam engine with oppositely disposed inclined planes of reciprocation and having two parallel crank shafts revolving at the same speed and in the same direction, said driving units operating independently of each of the other driving units except for a common source of live steam.

13. In a steam vehicle, a plurality of separate steam engine-axle units, each comprising a pair of drive wheels with a drive axle therebetween, and a single multi-cylinder steam engine having two parallel crankshafts each transmitting power to the driving axle, mounted in substantially static balance on said axle, wherein the planes of reciprocation of said cylinders are inclined on either side of said axle.

WILLIAM J. BESLER.
STANLEY J. WHITLOCK.